United States Patent Office 3,515,615
Patented June 2, 1970

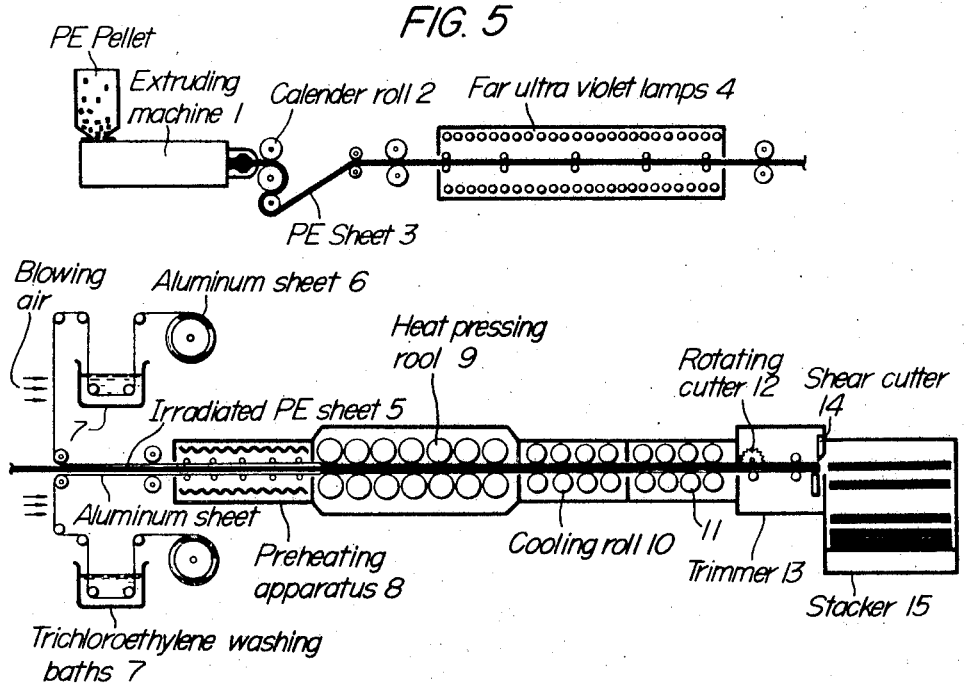

3,515,615
METHOD FOR BONDING SYNTHETIC RESIN SHEETS AND METAL SHEETS
Yoichi Okada and Tsutomu Watanabe, Yokohama, and Akemi Hasegawa, Yokosuka-shi, Japan, assignors to Sumitomo Bakelite Company Limited, Tokyo, Japan, a corporation of Japan
Filed Aug. 30, 1965, Ser. No. 483,477
Claims priority, application Japan, Sept. 5, 1964, 39/50,798
Int. Cl. B29c 19/02
U.S. Cl. 156—272
14 Claims

ABSTRACT OF THE DISCLOSURE

When ultraviolet rays of 2,100 to 1,600 A., especially of 1,849 A., are emitted from a low pressure mercury lamp whose tube is of quartz having a purity of not less than 99.90% and are irradiated in the presence of oxygen onto a synthetic resin sheet, the irradiated surface of the synthetic resin sheet becomes very reactive in melt-adhesion and a strong structural bond of the synthetic resin sheet to a metal sheet can be obtained.

---

Figure 1:
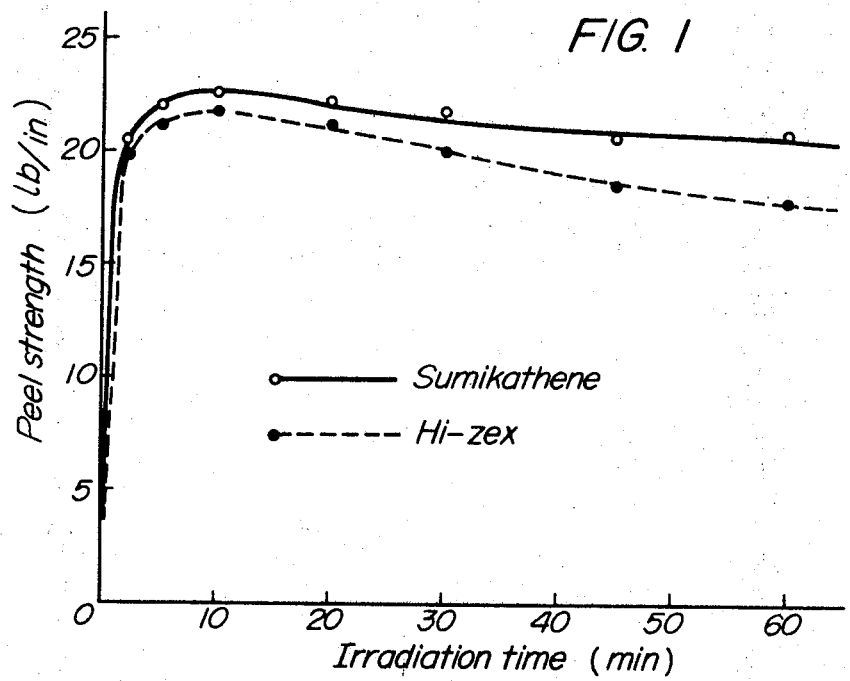

This invention relates to a method for bonding synthetic resin sheets and metal sheets.

In recent years, as there arose tendencies of lightening and prefabricating of building materials, and of lightening of carriages, automobiles, airplanes, ships, transporting vessels and the like, there have been sought structural materials which have light weight but are excellent in mechanical strength properties, especially flexural rigidity, and in impact damping properties. For this purpose there have been provided various kinds of sandwich materials having plastic foam, paper-honeycomb, aluminum-honeycomb, or so as core material and metal plate, plastic plate, plywood plate, or so as skin material, or having wood as core material and metal plate as skin material, or so on.

In the field of electric equipments, for the purpose of making size small and simplifying parts-packaging systems, there have been used laminates of synthetic resin plates and metal foils as electrical materials for printed-circuits base. Further, as special materials, are offered sound absorbing sandwich materials in which cork board, or porous tile is core, and holed plywood is skin. As these examples are offered a number of sandwich materials, which have features of sandwich structure depending on materials to be composed such as light weight, low cost, high mechanical strength, simplified structure, and thermal insulation, fire resistance, vibration resistance, and sound absorption. Such great progress in sandwich materials owes much to extraordinary progress in adhesives that there have appeared adhesives which are able to form strong structural bond between metals and non-metals.

Owing to this progress, sandwich materials of synthetic resin sheets with metal sheets gain a number of applications as excellent sandwich materials in which prominent properties of synthetic resins such as light weight, flexibility, impact damping property, water resistance, chemical resistance, electrical insulation and so on are combined with properties of metals such as rigidity, toughness and so on. Especially, in case of using as synthetic resin a polymerization-type high molecular weight compound such as polyethylene, or polystyrene, which is prominent in properties such as light weight, flexibility and so on, can be provided structural materials being variously applicable as above mentioned. However, because most of the conventional laminates need the use of adhesives, they bring the problems of high cost, complicated process, and many other inconveniences, for instance, that flexibility is decreased undesirably though bond strength is increased for use of adhesives. Further, because of inactivity of synthetic resins themselves, some of them cannot be easily bonded with metals even by using adhesives. There are some synthetic resins which can be bonded with metals by melt-adhesion (which means to contact synthetic resin sheet with metal sheet, then to make the surface of the synthetic resin sheet melt so as to bond it with the metal sheet), but many of them cannot obtain bonds having sufficient strength.

For example, it can be considered that if polyethylene which has prominent properties and is inexpensive can be easily bonded with metals, laminates which are useful as structural materials and electrical materials will be obtained. However, polyethylene itself is extremely inactive and hard to bond. For this reason, there has been a proposal that polyethylene be subjected to high energy radiation, X-ray, corona discharge, flame, or acid-dichromate mixed solution so as to increase active sites and wetability of adhesives; thereafter, it is bonded with metals by the use of adhesives. High energy radiation and X-ray require vast equipments and expenses, are accompanied by hazard of operation, and degrade properties of polyethylene itself. Corona discharge requires high electric voltage, tends to be influenced by ambient conditions, and is poor in consistency of treatment. Flame treatment not only is insufficient in bonding effect, but leads to thermal degradation of polyethylene. Acid-dichromate mixed solution treatment is insufficient in bonding effect and is inconvenient for corrosive agents are required. Thus, there have been no methods for good bonding synthetic resins as seen in this example.

On the other hand, there has been a proposal that metal surfaces be subjected to chemical oxidation treatment and thereafter be bonded with molten polyethylene. In this case, probably owing to anchor effect on rough metal surfaces and to the formation of hydrogen bonds and of chemical primary bonds between metal oxides and polyethylene whose surface is partially oxidized at high temperature by the metal oxides, bonding effect is increased, and bond strength can be obtained to some extent. However the bond strength is still insufficient, and particularly durability of bond strength which is most important in structural bonding is poor. Thus, though sandwich materials of synthetic resin sheets with metal sheets are useful industrial materials as structural materials, electrical materials as above-mentioned, there still remains the problem on the bonding.

It is an object of the present invention to provide a method for bonding synthetic resin sheets and metal sheets with strong structural bond.

It is an object of the present invention to improve bondability of synthetic resin to be molten and bonded with metal sheet by means of irradiating on synthetic resin sheet far ultraviolet ray having short wave lengths of 2,100–1,600 A. radiated from a low pressure mercury lamp whose tube is of high purity quartz.

It is an object of the present invention to provide a method for bonding synthetic resin sheets and metal sheets, which is suitable for industrial mass production, that is, continuously operable without degradation of synthetic resin itself, with ease of operation and at low cost.

It is still an object of the present invention to provide a method for bonding synthetic resin sheets and metal sheets, which provides a strong structural bond and product of which can retain a strong bond having less fatigue even after subjecting to heating-cooling temperature cycle, or repeated folding and having good durability.

It is still further an object of the present invention to provide a method for giving strong structural bond to the laminate structures consisting of synthetic resin sheets and metal sheets, which can be used for light weight constructions, electric equipments, or electronic equipments.

The present invention provides a method for bonding a polymerization-type high molecular weight compound sheet and a metal sheet, which comprises irradiating far ultraviolet ray having short wave lengths of 2,100–1,600 A. in the presence of oxygen on the surface of synthetic resin sheet comprising substantially a polymerization-type high molecular weight compound containing in the molecule at least 20% in molar ratio of the repeating structural units having the following general formula:

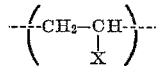

(wherein X is a member selected from the group consisting of hydrogen and phenyl group), then melt-adhesion of said synthetic resin sheet with the metal sheet at the temperature which is not lower than the melting point of said polymerization-type high molecular weight compound.

In the present invention, the polymerization-type high molecular weight compound containing in the molecule the repeating structural units (wherein units mean repeating units in the polymerization-type high molecular weight compound and not always mean structural units of monomers) having the following general formula:

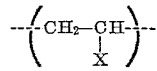

(wherein X is a member selected from the group consisting of hydrogen and phenyl group) includes: homo-polymers of ethylene, styrene, nuclear-substituted alkyl styrene such as methyl styrene, dimethyl styrene, ethyl styrene, or butyl styrene; homo-polymers of methoxystyrene, chlorostyrene, dichlorostyrene, p-vinyl benzoic acid, butadiene, isoprene, or chloroprene; copolymers of ethylene with α-olefine such as propylene, or butene-1, or with styrene, substituted styrenes, vinyl acetate, vinylidene chloride, methyl methacrylate, ethyl acrylate, dimethyl maleate, diethyl maleate, ethyl fumarate, acrylonitrile, or vinyl butyl ether; copolymers of styrene with α-methyl styrene, substituted styrene such as methyl styrene, dimethyl styrene, chlorostyrene, bromostyrene, iodostyrene, methoxystyrene, nitrostyrene, or dimethyl amino styrene, or with acrylonitrile, methacrylonitrile, esters of acrylic acid, esters of methacrylic acid, maleic anhydride, esters of maleic acid, esters of fumaric acid, vinyl acetate, vinylketone, alkyl vinyl ethers, butadiene, or isobutylene; copolymers of butadiene with styrene, substituted styrenes, acrylonitrile, methacrylonitrile, methyl vinyl ketone, esters of acrylic acid, esters of methacrylic acid vinylidene chloride, vinyl pyridine, or isobutylene. Herein, copolymers mean copolymers in any type of random copolymers, graft copolymers, or block copolymers which depends upon kind of monomer, and method of polymerization. Further, as polymerization-type high molecular weight compound in the present invention, can also be used random copolymers, block copolymers, graft copolymers, or copolymer-blends, which comprise as main components the three components of acrylic compounds, conjugated diolefines and aromatic vinyl compounds (hereinafter called ABS). Said acrylic compounds include acrylonitrile, methacrylonitrile, α - chloroacrylonitrile, methyl methacrylate, butyl methacrylate, ethyl acrylate, butyl acrylate, methyl α-chloroacrylate, acrylic acid, and methacrylic acid. Said conjugated diolefines include butadiene, isoprene, dimethyl butadiene, chloroprene, cyclopentadiene, methyl pentadiene, 1,1,4,4 - tetra - methyl butadiene, pyperylene, myrcene, and allo-ocymene.

Said aromatic vinyl compounds include styrene, α-methyl styrene, methyl styrene, α-methyl-p-methyl styrene, butyl styrene, α-chlorostyrene, dichlorostyrene, and β-vinyl naphthalene.

In the present invention, the synthetic resin comprising as main component the various kinds of polymerization-type high molecular weight compounds above mentioned is used in the form of sheet. Of course, other resins or modifiers may be admixed with said compounds in order to improve the properties of said sheet.

The metals used in the present invention include aluminium, copper, iron and the alloys consisting of any of these metals as main component and one or more of magnesium, manganese, nickel, cobalt, chromium, titanium, tin, zinc, lead, bismuth, cadmium, beryllium, thallium, and silicon.

In the present invention, the synthetic resin and the metal are used respectively in the form of sheet. Herein, sheet has such a range of thickness as several ten $\mu$ to several cm. and includes so-called sheets, films, and foils.

In the method of the present invention, the synthetic resin sheet comprising substantially a polymerization-type high molecular weight compound containing in the molecule at least 20% in molar ratio of the repeating structural units having the following general formula:

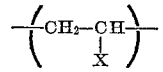

(wherein X is a member selected from the group consisting of hydrogen and phenyl group) and being irradiated with far ultraviolet ray having short wave lengths of 2,100–1,600 A. in the presence of oxygen, is molten and bonded with a metal sheet, as described hereinafter in more details and concretely.

First of all, as to the light source required for treating the synethic resin sheet with far ultraviolet ray an ordinary ultraviolet lamp cannot be used because far ultraviolet ray having short wave lengths of 2,100–1,600 A. is absorbed into its tube wall. In the present invention, as light source of far ultraviolet ray, is used a low pressure mercury lamp, the tube wall material of which is of high purity quartz. The high purity quartz has a purity not lower than 99.90%. Impurities such as titanium, and iron are not preferably higher than 10 p.p.m. because they tend to decrease optical transmittance of quartz by solarization. Use a mercury lamp having such tube wall material, and it is possible to produce far ultraviolet ray having short wave lengths of 2,100–1,600 A. in a practical amount. A quartz whose purity is about 99.95% can be gained by means of repeating recrystallization of the quartz on the market. In the case of using this quartz for the low pressure mercury lamp and making its wall thickness 10 mm. the transmittance in the range of 2,100–1,600 A. is 40–50%. In the case of a quartz 10 mm. thick having a purity not lower than 99.99% such as synthetic fused silica, for examples, Spectrosil, Suprasil, and Vitreosil (these are trade names), the transmittance reaches up to 90% or higher and thus very efficient. Usually the thickness of tube wall is in the range of 0.5–5 mm.; however, the lower the purity is, the thinner the tube wall should be. Inside the low pressure mercury lamp, mercury drops together with a starting rare gas such as helium, neon, argon, xenon, or krypton. Sodium vapor can also be added besides mercury and rare gases. In lighting, it is preferable to maintain the mercury vapor pressure inside the tube in the range of $5 \times 10^{-4}$–$1 \times 10^{-1}$ mm. Hg by cooling a part of the lamp. Below $5 \times 10^{-4}$ mm. Hg, radiation intensity is insufficient; above $1 \times 10^{-1}$ mm. Hg, the production of far ultraviolet ray having short wave length of 2,100–1,600 A. decreases because of self-absorption of mercury vapor. The shape of low pressure mercury lamp may be any kind of shape such as tubular, globular. U-letter, or spiral. In the case of tubular shape, a lamp having a diameter of 10–60 mm. and a distance between electrodes of 10–200 cm. is preferably used. Preferably, the electric output of lamp is 5–300 w. per a lamp, and the output per 1 cm. of the distance between electrodes is 0.2–2 w.

Using as a source of far ultraviolet ray having short wave lengths of 2,100–1,600 A. from a low pressure mercury lamp as above mentioned, and keeping irradiation distance between the lamp and the synthetic resin sheet in the range of 0.5–20 cm., far ultraviolet ray irradiation treatment is conducted. If the irradiation distance is shorter than 0.5 cm., the temperature of lamp tube wall rises up too highly. If the irradiation distances is longer than 20 cm., there arise disadvantages in the effect of irradiation, the size of apparatus, and so on.

Time of irradiation treatment is preferably about 1–60 minutes. If it is too long, the irradiation effect is lowered, and the bonding strength is reduced. Further the long time is inconvenient in the economic point of view. Substantially sufficient irradiation time is within 30 minutes. As to the irradiation amount which means the product of light intensity by irradiation time, it is only necessary to adjust the light intensity of 2,100–1,600 A. on the irradiated surface to be 0.1–10 mw./cm.$^2$ preferably 0.3–3 mw./cm.$^2$. The light intensity can be measured by passing through a lithium fluoride filter which has been colored by irradiation with, for example, X-ray or $\gamma$-ray, catching the resulting monochromatic light by means of a thermo-couple, and amplifying the thermoelectric current produced; it can be measured by spectrometry with a diffraction grating, catching with a photo electric tube and amplifying the photoelectric current produced; it can be measured according to other methods. Usually the light intensity on a perpendicular plane at a given distance from the lamp is measured in the air and is represented in the unit of $\mu$w./cm.$^2$.

The irradiation is necessary to be conducted in the presence of oxygen; in the atmosphere of nitrogen or inert gas, any prominent effect on bonding strength does not appear. During irradiation surface temperature of the synthetic resin sheet is not particularly limited, and irradiation can be conducted in the range from room temperature to considerably high temperature, that is, temperature near the melting point.

When the synthetic resin sheet which has been subjected to the irradiation treatment as above mentioned is molten and bonded with a metal sheet within 0.5 minutes to 30 hours after the irradiation, the irradiation effect hardly changes and decreasing of bonding strength is hardly observed. The melt-adhesion can be done according to any method using hot press or hot roll. The bonding temperature should be not lower than the melting point of the synthetic resin sheet and is preferably 160–240° C. If the temperature is too high, thermal oxidations of the synthetic resin or the metal themselves lower their properties, and such a high temperature is not desirable either in the economic point of view. Accordingly the bonding temperature is conveniently at highest about 250° C. Pressure upon the bonding may be from the contact pressure to 60 kg./cm.$^2$. The pressure in the case of thick synthetic resin sheet may be lower than one in the case of thin sheet, for instance, from the contact pressure to 20 kg./cm$^2$. for thickness of several mm. and 20–60 kg./cm.$^2$ for thin film-like sheets. The pressing time, in the case of using a hot press, is 0.5–60 minutes preferably 2–20 minutes. In the case of using hot rolls, though the pressing time is difficult to be determined, it is sufficient to pass the sheets through 5–20 couples of hot roll at a rate of 5–200 m./hr. Too long pressing time is rather meaningless because the effect of bonding decreases. After the melt-adhesion, cooling is conducted. It is possible to remove the sheets out of the hot press or the hot rolls and to make them stand for cooling as they are, but in this case it is due to the difference of coefficients of thermal expansion between synthetic resin and metal that inner stress remains to some extent. Hence, it is preferable to conduct cooling by means of a cold press or cold rolls. It is also preferable to cool the sheets gradually from the temperature 20° C. above the melting point of the synthetic resin, to the temperature 30° C. below said melting point, over a period of 5–50 minutes, then to the room temperature.

When the irradiated synthetic resin sheet is molten and bonded with a metal sheet without any sort of surface treatment, that is, as it is, strong structural bond can be gained, while it is also preferable to roughen or oxidize a surface of the metal sheet in order to increase the bonding strength furthermore. For instance, mechanical roughening by means of emery paper abrasion (sandblast or liquid horning) using as abrasive sand, silica, silicon carbide, alumina, chromium oxide, rouge, lime, or metal grit; chemical roughening using a single or mixed aqueous solutions of inorganic acids such as phosphoric acid, nitric acid, sulfuric acid, hydrochloric aid, hydrofluoric acid, or chromic acid or an aqueous alkaline solution containing sodium hydroxide, or potassium hydroxide; electrolytic roughening in an aqueous solution containing perchloric acid, phosphoric acid, sulfuric acid, or nitric acid and the like, can increase the bonding strength by about 1–3 lb./in. Chemical oxidation treatment using a mixed acids solution containing sulfuric acid and an alkali metal dichromate, an alkali etching mixed solution containing sodium hydroxide and an alkali metal meta-silicate or an alkali metal pyrophosphtae, or anodic oxidation treatment in an aqueous solution containing sulfuric acid, oxalic acid, chromic acid, an alkali metal borate, or ammonium borate can increase the bonding strength by about 1–5 lb./in.

In practicing of the method of the present invention, one needs to take care of various points as above mentioned, and producing process in industry will be described hereinafter.

A synthetic resin sheet is subjected to irradiation treatment at a distance of 0.5–20 cm. from a low pressure mercury lamp having an electrical output of 5–300 w. per lamp and made of high purity quartz having a purity of at least 99.90%, at a high intensity of 0.1–10. mw./cm.$^2$ for a 1–60 minutes. Within 0.5 minutes–30 hours after the irradiation treatment, the synthetic resin sheet is molten and bonded with a metal sheet at the temperature of 160–240° C. and under a pressure of the contact pressure to 60 kg./cm.$^2$ for a period of 0.5–60 minutes in the case of press method or passing the sheets through 5–20 couples of hot roll at a rate of 5–200 m./hr. in the case of roll method. Thereafter the sheet is gradually cooled from the temperature 20° C. above the melting point of the synthetic resin, to the temperature 30° C. below said melting point, over a period of 5–50 minutes, to the room temperature by means of a cold press or a cold rolls. It is very convenient from the industrial point of view to carry out the whole steps continuously. Thus, it is an effective process to extrude a synthetic resin sheet out of an extruding machine then to irradiate far ultraviolet ray on said sheet as it is and immediately after thta to melt and bond said sheet with a metal sheet by means of hot rolls. Besides it may be effective to carry out preheating before the melt-adhesion. Further, any heating method may be employed as far as only the contacted surface of the synthetic resin sheet with the metal sheet can be bonded. Besides hot roll, it is possible to heat only the metal sheet by means of high frequency wave induction on heating before melt-adhesion. Conventional apparatuses of press or rolls are sufficient, and yet it is favorable to make special apparatuses for the working of present invention.

According to the present invention, it is possible to bond strongly a synthetic resin sheet and a metal sheet by a very simple process as stated heretofore. A feature of the present invention is that far ultraviolet ray having short wave lengths of 2,100–1,600 A. acts selectively on the high molecular weight compound having the specified molecular structure in the presence of oxygen and gives specific bonding effect which makes it possible for the synthetic resin sheet to be molten and bonded strongly with a metal sheet. Considering from the fact that the far ultraviolet ray having short wave lengths of 2,100–1,600 A. is effective in the presence of oxygen, it is assumed that the effect would be resulted from a sort of oxidation reactions on the synthetic resin surface. Hithertofore, that ultraviolet ray is effective on oxidation of synthetic resin is apparent from the fact that a synthetic resin is degraded by the sunlight as well known. Also it is well known that ultraviolet ray irradiation is effective as a treating method to improve printability of polyethylene and the like. However, on both cases, the ultraviolet ray irradiation is not one having short wave lengths of 2,100–1,600 A. In the case of natural ultraviolet ray, parts having wave length shorter than 2,100 A. are absorbed in the upper layer of the atmosphere, and the ultraviolet ray reaching the earth hardly contains wave length parts shorter than 2,100 A. Also in the case of so-called ultraviolet lamps on the market, most of wave length parts shorter than 2,100 A. are absorbed into the tube wall and therefore any irradiation effects of far ultraviolet ray having short wave lengths of 2,100–1,600 A. have never been observed practically, or have been overlooked by the present invention. When ultraviolet ray having a wave length longer than 2,100 A. is radiated for a period from several ten hours to several hundred hours with an intention of improving bondability, some improvement in bondability can be observed as far as bonding is effected by the use of an adhesive, but it was impossible to obtain such a strong bonding as in the present invention, only by melt-adhesion. In addition, in the above case, the synthetic resin itself is degraded during the long time of irradiation and becomes impractical. On the other hand, rays having wave lengths shorter than 1,600 A., especially rays having wave length shorter than 500 A. such as X-ray, show so great penetrating power through the synthetic resin sheet, that they give no prominent effects of improving bondability, and the resin itself is considerably degraded, becoming impractical. Thus, there is observed the specific bonding effect to make possible a strong bonding by melt-adhesion without any adhesive, as far ultra violet ray having short wave lengths of 2,100–1,600 A. is used. The specificity of the far ultraviolet ray action is apparent from various respects. First of all, said far ultraviolet ray acts selectively or exclusively on a polymerization-type high molecular weight compound containing in the molecule at least 20% in molar ratio of repeating structural units having the following general formula:

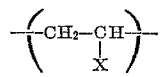

(wherein X is a member selected from the group consisting of hydrogen and phenyl group) and gives a very specific bonding effect to make possible a strong melt-adhesion with the metal. As before mentioned, it is assumed that the effect of far ultraviolet ray is resulted primarily from oxidation reaction. As for polymers such as polypropylene and polyvinyl chloride are expected to be oxidized more easily than polyethylene; nevertheless, any effect of far ultraviolet ray does never appear on these polymers. This means that the oxidation reaction above mentioned is specific depending on the chemical structure of the synthetic resins. Further, the fact that only oxidation by ultraviolet ray having wave lengths longer than 2,100 A. gives no similar bonding effect suggests that the action of far ultraviolet ray having short wave lengths of 2,100–1,600 A. produces the specific oxidation reaction, and that certain photo chemical reactions, thereby, give very characteristic results at the same time. Secondly, the synthetic resin sheet whose bondability has been improved to subject it to irradiation treatment of far ultraviolet ray having short wave lengths 2,100–1,600 A. can be molten and bonded with a metal sheet easily and gives a strong bond strength observed. When the peel strength of contact surface is determined under the test conditions as described later, an increase in peel strength of at least 10 lb./in., compared with the case without far ultraviolet ray irradiation treatment, can be observed. Then if preferable conditions are selected, an increase in peel strength of 15 lb./in. or more can be observed. Further, if the metal sheet has been subjected to treatments such as roughening or oxidation, an increase in peel strength of 20 lb./in. or more can be observed. Polymers such as polyethylene or polystyrene hardly show bondability or give only a peel strength of at highest about 5 lb./in. in the case of being without any treatment. Even in the case of being with such a known treatment as irradiation treatment by means of ultraviolet ray having long wave lengths longer than 2,100 A., of X-ray, or of high energy radiation, corona discharge, mixed acid-dichromate treatment, or flame treatment, only peel strength of about 5–10 lb./in. can be obtained. Further even in the case of being with such treatment as roughening, oxidation, or so also on metal sheet, usually only a peel strength not higher than 15 lb./in. can be obtained, which is not sufficient in practice, though occasionally a peel strength higher than 15 lb./in. can be obtained. In contrast, according to the method of the present invention, a peel strength of at least 15 lb./in. or more can be obtained. Adding that, if preferable conditions are selected, 20 lb./in. or more can be obtained. Further, if the metal sheet is treated, a peel strength not lower than 25 lb./in. can be obtained. Further a laminate according to the conventional treating methods cannot withstand the inner stress owing to expansion and shrinking of the materials in a heating-cooling cycle such as weathering and forced temperature changing treatment (100° C./0° C.) and as a result warp, twist, and expand, and thereby obtain the bond strength much reduced. However, according to the method of the present invention bond strength of the laminate hardly changes even after a long time temperature changing treatment; further, it shows much less fatigue against repeated folding it or toughness tests, compared with the laminate obtained by conventional methods, and it can sufficiently withstand etching treatment, soldering immersion treatment and the like which are requested for electric materials. Thus, the laminate obtained by being subjected to far ultraviolet ray irradiation treatment and being molten and bonded, shows much excellent bonding effect, compared with those subjected to various treatments by means of the conventional high energy radiation, X-ray, corona discharge, or acid-dichromate mixed solution, and it demonstrates well the specificity of the action of far ultra violet ray.

According to the present invention, a synthetic resin sheet and a metal sheet can be bonded easily in various configurations. For instance, it is possible to select a desired configuration such as a sandwich material in which a synthetic resin sheet is core and metal sheets are skin, a sandwich material in which a metal sheet is core and synthetic resin sheets are skin, a material in which metal sheets and synthetic resin sheets are overlapped alternatively; it is possible to obtain further sandwich materials of various configurations taking into consideration of their thicknesses. Such a sandwich material has a strong bond strength, is strong against temperature changing, has excellent properties also in respects of repeated bending fatigue, toughness and so on, and is good in workerabilities such as punching, cutting, postforming, deep-drawing, screw fastening, edge working and the like. Accordingly, it can be applied broadly in various fields such as light weight structural materials, impact damping materials, transporting vessels, flexible electric distributing materials, eletcric shielding materials, printed-circuits materials. For example, it can be applied in curtain walls, partition walls, panels for coal mine, roof, ceiling, flooring, panel door, panel, deck, container, curtain, carriage, automobile, airplane, bath, water tank, electric condenser, core memory, motor winding, coil circuit, etc. In every field, the present invention provides useful materials which are suitable to the purpose of mass production, fabrication (prefabrication), light weight, small size, and micro-modulation.

In this specification, a peel strength representing bond strength is according to ASTM D 903–49. It is measured to melt and bond with a metal sheet to be measured the surface of a specimen of a synthetic resin sheet of 1 inch width and 4 inches length whose back surface is lined with a metal sheet of thickness 1 mm., and to peel off the metal sheet which has been molten and bonded to use air micro type testing machine at a peeling rate 5 mm./min. in the direction of 180° when the thickness of the metal sheet is more than 0.15 mm., or at a peeling rate of mm./min. in the direction of 90° when said thickness is less than 0.15 mm. Usually the determination is carried out to use a metal sheet of 0.3 mm. thickness.

A shear strength is according to ASTM D 1002–53T and shows the strength in drawing with Shopper type testing machine at overlap area of 1 inch x ½ inches and at drawing rate of 5 mm./min.

The ratios of reagents for chemical treatments in Examples are represented by "parts by weight."

Hereinafter, Examples of the present invention will be illustrated. In the Examples, there have been used Sumikathene G–101 (made by Sumitomo Chemical Co.) as low density polyethylene, Hizex 7000 (made by Mitsui Petrochemical Co.) as high density polyethylene, Kralastic MH–R1801 (made by U.S. Rubber Co.), Cycolac T–1000 (made by Marbon Chemical Co.) and Lustrun 610 (made by Monsanto Chemical Co.) as ABS resin.

EXAMPLE 1

After cleaning a low density polyethylene (Sumikathene G–101) sheet having thickness 3 mm. with toluene, far ultraviolet ray was radiated from a straight type low pressure mercury lamp (60 w.) whose tube wall is of high purity—99.98% optical quartz at 127 v. and 600 ma. and irridated on a surface of the polyethylene sheet at 2 cm. distance for 5 minutes in the air. An aluminum sheet having thickness 0.3 mm. was cleaned with trichloroethylene, was overlaid with the polyethylene sheet on the irridated surface, and then was pressed by a hot press at 200° C. under 15 kg./cm.$^2$ pressure for 2 minutes so that said surface is molten and bonded with the aluminum sheet. The peel strength of resulting specimen was 22.0 lb./in. In the case of melt-adhesion using a polyethylene sheet unirradiated for the purpose of comparison, the peel strength was 4.8 lb./in.

EXAMPLES 2–11

As for sheets (thickness 3 mm.) of various kinds of synthetic resins being applicable in the present invention, a surface of each sheet was subjected to the far ultraviolet ray irradiation treatment in the same way as in Example 1, and then was molten and bonded with an aluminium sheet having thickness 0.3 mm. which has been cleaned with trichloroethylene. Conditions and peel strength with respect to each synthetic resin are shown in Table 1.

For the purpose of comparison, also data of unirradiated cases are shown.

TABLE 1

| Example No. | Synthetic Resin | Trade Name | Irradiation Time (min.) | Fusing Temperature (° C.) | Peel Strength l(lb./in.) |
|---|---|---|---|---|---|
| 2 | Polyethylene | Hizex 7000 (Mitsui Petrochemical Co.) | 0<br>5 | 200<br>200 | 2.2<br>20.8 |
| 3 | Polystyrene | Dialex HF55-247 (Mitsubishi Monsanto Co.) | 0<br>5 | 200<br>220 | 0<br>16.1 |
| 4 | ABS | Kralastic MH-R1801 (U.S. Rubber Co.) | 0<br>5 | 200<br>200 | 0<br>27.3 |
| 5 | Ethylene-Vinyl Acetate Copolymer | Elvax 250 (Du Pont Co.) | 0<br>5 | 200<br>200 | 21.8<br>35.6 |
| 6 | Ethylene-Vinyl Acetate Copolymer | Elvax 40 (Du Pont Co.) | 0<br>5 | 200<br>200 | 20.3<br>32.2 |
| 7 | Ethylene-Propylene Copolymer | EPR-NC (Montecatini Co.) | 0<br>5 | 200<br>200 | 0<br>17.0 |
| 8 | Polystyrene containing rubber | | 0<br>5 | 200<br>200 | 0<br>24.8 |
| 9 | Styrene-Acrylonitrile Copolymer | Tyril 767R-5800 (Asahi Dow Co.) | 0<br>5 | 200<br>200 | 0<br>19.0 |
| 10 | Styrene-Butadiene Copolymer | Hycar 2057 (Japanese Geon Co.) | 0<br>5 | 180<br>180 | 0<br>20.6 |
| 11 | Acrylonitrile-Butadiene Copolymer | Hycar 1432 (Japanese Geon Co.) | 0<br>5 | 180<br>180 | 3.0<br>15.4 |
| 12 | Polybutadiene | JSR-BROI (Japan Synethic Rubber Co.) | 0<br>5 | 180<br>180 | 7.1<br>18.1 |

Examples for comparison 1–8

For the purpose of comparison, as for sheets (thickness 3 mm.) of various kinds of synthetic resins being not applicable in the present invention, a surface of each sheet was subjected to the far ultraviolet ray irradiation treatment in the same way as in Example 1, and then was molten and bonded with an aluminum sheet having thickness 0.3 mm. which has been cleaned with trichloroethylene.

Conditions and peel strength with respect to each synthetic resin are shown in Table 2.

Besides, data of unirradiated cases are also shown.

TABLE 2

| Example for Comparison No. | Synthetic Resin | Trade Name | Irradiation Time (min.) | Fusing Temperature (° C.) | Peel Strength (lb./in.) |
|---|---|---|---|---|---|
| 1 | Polypropylene | Sumilite NS-1100 (Sumitomo Bakelite Co.) | 0 | 220 | 0 |
|   |   |   | 5 | 220 | 0 |
| 2 | Polyvinyl Chloride | Sumilite VS-9151 (Sumitomo Bakelite Co.) | 0 | 200 | 0 |
|   |   |   | 5 | 200 | 0 |
| 3 | Polyisobutylene | Vistanex MML-100 (Esso Standard Oil Co.) | 0 | 180 | 8.7 |
|   |   |   | 5 | 180 | 9.2 |
| 4 | Polymethyl Methacrylate | Fujika Glass (Fujikura Kasei Co.) | 0 | 200 | 0 |
|   |   |   | 5 | 200 | 0 |
| 5 | Polyamide | Amilan CM-1031 (Toyo Rayon Co.) | 0 | 280 | 13.5 |
|   |   |   | 5 | 280 | 14.0 |
| 6 | Polyethylene Terephthalate | Tetron DF-100 (Toyo Rayon Co.) | 0 | 280 | 0 |
|   |   |   | 5 | 280 | 0 |
| 7 | Polyacetal | Delrin-150X (Du Pont Co.) | 0 | 220 | 0 |
|   |   |   | 5 | 220 | 0 |
| 8 | Acrylic Rubber | Hycar 4021 (Japanese Geon Co.) | 0 | 180 | 11.9 |
|   |   |   | 5 | 180 | 12.1 |

EXAMPLES 13–20

As for polyethylene sheets and ABS sheets a surface of each sheet was subjected to the far ultra-violet ray irradiation treatment in the same way as in Example 1 and then was molten and bonded with a metal sheet whose metal was selected from various kinds. The results are shown in Table 3.

TABLE 3

| Example No. | Kind of Metal sheet | Synthetic Resin Sheet | Thickness of Synthetic Resin Sheet, mm. | Thickness of Metal Sheet, mm. | Treatment Method of Metal Surface | Peel Strength (lb./in.) | Shear Strength (lb./in.²) |
|---|---|---|---|---|---|---|---|
| 12 | Aluminum | ABS (Cycolac) | 3 | 0.3 | Trichloro-ethylene Washing | 25.45 |   |
| 13 | Copper | Polyethylene (Sumikathene) | 3 | 0.05 | Electrolytic Roughening [a] | 16.2 |   |
| 14 | do | ABS (Cycolac) | 3 | 0.05 | do | 18.0 |   |
| 15 | Mild steel | Polyethylene (Hizex) | 6 | 0.6 | Phosphoric acid Immersion [b] |   | 1,020 |
| 16 | do | ABS (Lustrun) | 5 | 0.6 | do |   | 1,540 |
| 17 | Duralumin | Polyethylene (Sumikathene) | 8 | 0.5 | Wire Brush Abrasion [c] |   | 1,270 |
| 18 | Stainless steel | do | 8 | 0.5 | Chromic Acid Immersion [d] |   | 930 |
| 19 | Brass | Polyethylene (Hizex) | 6 | 1.0 | Degrease [e] |   | 880 |

[a] Surface was roughened in an acid solution by applying electric current of 60 a./dm.² at 15 v. in the end of electrolysis.
[b] Immersed in mixed solution containing 50 parts of concentrated phosphoric acid and 1 part of methanol at 60° C. for 10 minutes.
[c] Surface was roughened by rotating wire brush of 80 mesh.
[d] Immersed in solution of chromium trioxide 18 parts and water 100 parts at 60° C. for 10 minutes.
[e] Degreased in trichloroethylene vapor for 20 minutes.

EXAMPLES 21–22

As for low density polyethylene (Sumikathene) sheets and ABS (Kralastic) sheets, a surface of each sheet was subjected to the far ultraviolet ray irradiation treatment in the same way as in Example 1 and then was molten and bonded with an aluminum sheet. The resulting specimens were subjected to weathering treatment, repeated folding fatigue test, forced temperature changing (100° C./0° C.) to examine changes of bond strength. The results are shown in Table 4.

For the purpose of comparison, as for low density polyethylene (Sumikathene) sheets and ABS (Kralastic) sheets, according to the conventional method without the far ultraviolet ray irradiation treatment, a surface of each sheet was molten and bonded with an aluminum sheet which has been subjected to surface roughening treatment with 120 mesh sandpaper and then further subjected to oxidation treatment by immersing in mixed solution containing 10 parts of concentrated sulfuric acid, 1 part of sodium dichromate and 30 parts of water at 70° C. for 10 minutes. The resulting specimens were subjected to said tests. The results also are shown in Table 4.

TABLE 4

|   | Peel Strength | | | |
|---|---|---|---|---|
|   | Example 21 | Comparison Example | Example 22 | Comparison Example |
|   | FUV irradiated polyethylene and untreated aluminium | Unirradiated polyethylene and treated aluminium | FUV irradiated ABS and untreated aluminium | Unirradiated ABS and treated aluminium |
| Weathering, lb./in.:[a] | | | | |
| 0 hour | 22.5 | 17.5 | 26.8 | 18.3 |
| 100 hours | 22.0 | 15.2 | 26.0 | 15.7 |
| 200 hours | 21.7 | 13.9 | 25.0 | 14.6 |
| 500 hours | 20.4 | 10.1 | 24.2 | 10.8 |
| 1,000 hours | 20.2 | 9.0 | 23.2 | 10.1 |
| Repeated bending, lb./in.²; [b] | | | | |
| 0 cycle | 1,030 | 690 | 1,440 | 910 |
| 10³ cycles | 970 | 85 | 1,320 | 590 |
| 10⁴ cycles | 870 | 0 | 1,230 | 430 |
| 10⁵ cycles | 610 | 0 | 1,160 | 220 |
| Forced temperature changing, lb./in.:[c] | | | | |
| 10 cycles | 20.8 | 13.0 | 25.5 | 15.4 |
| 20 cycles | 19.4 | 7.7 | 24.9 | 12.2 |
| 50 cycles | 16.6 | 4.5 | 22.7 | 7.5 |

[a] Peel strength was measured after exposing the resulting specimens in accordance with JISZ-0230, under the conditions of black-panel temperature 63° C. and cold water spray cycle 12 minutes/60 minutes and by the use of standard weather meter.
[b] Shear tensile strength was measured after providing the resulting specimens repeatedly constant folding stress of 70 kg./cm.² under 1,720 cycle/min. by the use of plastic material folding fatigue testing machine in accordance with ASTM-D-671-51/T.
[c] Peel strength was measured after repeating immersion cycle of 5 minutes in boiling water followed by 5 minutes in ice water.

As shown in Table 4, the sheets of melt-adhesion, after far ultraviolet ray irradiation treatment, are less in aging of bond strength and fatigue. Even after 1,000 hours (equivalent to 5 years) of weathering treatment, polyethylene retains 90% of initial bond strength and ABS retains 85%. Even after $10^5$ cycles of repeated folding fatigue treatment, polyethylene retains 60% and ABS retains 80%. Even after 50 cycles of forced temperature changing treatment (100° C./0° C.), polyethylene retains 75% and ABS retains 85% of the initial bond strength respectively.

The results are shown in Table 5. For the purpose of comparison, also with respect to polyethylene only, ABS only and aluminium only of the same thickness, the similar characteristics were measured.

As shown in Table 5, sanwich panels, with only a small amount of aluminum in the proportion of thickness, show much higher flexual characteristics than the synthetic resin itself and good rigidity as well as excellent impact characteristics to compare with aluminum, thus possess sufficient characteristics as light weight material.

TABLE 5

| Ex. No. | Core Material | Aluminum thickness Ratio (percent) | Flexural Strength a ($\times 10^3$ lb./in.$^2$) | Flexural Elasticity Modulus b ($\times 10^6$ lb./in.$^2$) | Rigidity c | Falling Ball Impact Value d (mm.) | Shopper's Impact Value e (mm.) |
|---|---|---|---|---|---|---|---|
| 23 | Sumikathene | 0 | 1.4 | 0.1 | 71 | | |
| | | 14 | 8.0 | 1.2 | 150 | | |
| | | 20 | 10.4 | 1.6 | 154 | 1.78 | 10.8 |
| | | 25 | 13.6 | 1.8 | 132 | | |
| | | 36 | 18.3 | 2.0 | 109 | | |
| | | 52 | 24.5 | 2.2 | 90 | | |
| 24 | Hizex | 0 | 3.4 | 0.1 | 29 | | |
| | | 14 | 10.2 | 2.0 | 196 | | |
| | | 20 | 12.2 | 2.8 | 230 | 0.94 | 11.6 |
| | | 25 | 15.5 | 3.1 | 200 | | |
| | | 36 | 20.2 | 3.7 | 183 | | |
| | | 52 | 26.0 | 4.3 | 165 | | |
| 25 | Kralastic | 0 | 8.7 | 0.3 | 35 | | |
| | | 14 | 13.6 | 2.0 | 147 | | |
| | | 20 | 16.0 | 2.9 | 181 | 0.57 | 8.5 |
| | | 25 | 17.5 | 3.4 | 194 | | |
| | | 36 | 22.2 | 4.5 | 202 | | |
| | | 52 | 26.7 | 5.4 | 202 | | |
| | Aluminium | 100 | 35.5 | 6.9 | 194 | 0.48 | 4.25 | a Flexural strength was measured being in accordance with ASTM D 790 49T and using panel of 1 inch x 4 inches at span 48 mm. and at flexing rate 1.5 mm./minute.
b Flexural elasticity modulus was measured in the same way as in the case of flexural strength.
c Rigidity is herein defined as practical standard as flexural elasticity modulus/flexural strength.
d Falling ball impact value; depth (mm.) of cavity produced when a spherical ball having diameter 20 mm. and weight 200 g. is fallen from height 1 m. onto panel having diameter 50 mm. sustained in mid-air.
e Shopper's impact value; depth (mm.) of bend produced when bar-like impact of 13.6 kg./cm. is given on panel of 1 inch x 4 inches at span 60 mm.

On the contrary, in the conventional methods in which only metal sheets are treated and melt-bonded with untreated synthetic resin sheets, bond strengths are lowered and come to lose practicability. In particular, after 1,000 hours of weathering treatment polyethylene has only 50% and ABS has only 55%; after $10^3$ cycles of repeated bending fatigue treatment polyethylene has nearly 0% and ABS has only 25%; after $10^5$ cycles of forced temperature changing treatment (100° C./0° C.) polyethylene has only 25% and ABS has only 40% of the initial bond strength respectively.

EXAMPLES 23–25

As for each of low density polyethylene sheets (Sumikathene), high density polyethylene sheets (Hizex) and ABS sheets (Kralastic), both of upper and lower surfaces were molten and bonded with aluminium sheets after far ultraviolet ray irradiation treatment, in the same way as in Example 1, so that each sandwich panel obtained has 3 mm. of total thickness. By varying proportions of synthetic resin and aluminium, were examined the changes of flexual properties and impact properties.

EXAMPLES 26–27

As for low density polyethylene (Sumikathene) sheets and ABS (Kralastic) sheets having thickness of 3 mm., after the far ultraviolet ray irradiation treatment being in accordance with Example 1, a surface of each sheet was molten and bonded with an aluminum sheet having thickness of 0.3 mm. and having been subjected to surface treatment variously. The peel strength is shown in Table 6.

For the purpose of comparison, also are on Table 6 the peel strength in the cases of low density polyethylene (Sumikathene) sheets and ABS (Kralastic) sheets without the far ultraviolet ray irradiation treatment and in the cases of said sheets with not said treatment but another treatment.

As shown in Table 6, when melt-adhesion is conducted according to not far ultraviolet ray irradiation treatment but another treatment, peel strengths are extremely low. In the cases of treating aluminium sheets the peel strength is increased by a 3–5 lb./in. than ones in the cases of untreating.

TABLE 6

| Ex. No. | Synthetic Resin | Synthetic Resin Treating Method a | Peel Strength (lb./in.) Aluminium Treating Method b | | | | |
|---|---|---|---|---|---|---|---|
| | | | Untreatment | Sandpaper Abrasion | Acid Dichromate Etching | Anodic Oxidation | Sandpaper Abrasion Combined with Acid-Dichromate Etching |
| 26 | Polyethylene | Untreatment | 4.2 | 12.0 | 10.4 | 16.5 | 17.6 |
| | | FUV irradiation | 22.3 | 25.6 | 26.3 | 25.7 | 27.0 |
| | | UV irradiation | 8.1 | 12.8 | | | |
| | | High energy ray irradiation | 8.7 | 14.0 | | | |
| | | X-ray irradiation | 6.4 | 12.5 | | | |
| | | Corona discharge | 11.0 | 17.0 | | | |
| | | Mixed acids treatment | 7.3 | 13.1 | | | |
| | | Flame treatment | 5.9 | 11.4 | | | |
| 27 | ABS | Untreatment | 0.0 | 5.5 | 7.6 | 11.9 | 18.3 |
| | | FUV irradiation | 26.8 | 30.2 | 30.0 | 30.4 | 31.6 |
| | | UV irradiation | 12.5 | 16.8 | | | |
| | | Corona discharge | 13.5 | 17.9 | | | | a Degrees FUV irradiation; method of the present invention.
Degrees UV irradiation; irradiation under the same conditions as in the present invention but by the use of Vycor glass (Vycor 791) mercury lamp.
Degrees high energy ray irradiation, irradiation at distance of 20 cm. for 30 sec. by the use of Van de Graff electronic accelerator of 3 Mev. and 1 ma.
Degrees X-ray irradiation; irradiation at distance of 10 cm. for 10 min. by the use of Proto type X-ray tube of 50 KVP and 100 ma.
Degrees corona discharge; treatment at distance 1 cm. at rate of 4 m./min. for 2 min. by the use of Tesla coil of 15,000 v. and 2 ma.
Degrees acid-dichromate etching; immersion at 50° C. for 20 min. in solution saturated with potassium dichromate in concentrated sulfuric acid.
Degrees flame treatment; heating top surface of synthetic resin sheet by gas-burner while cooling the back surface by water.
b Degrees sandpaper abrasion; roughening surface by contact-rotating of disksanding of 120 mesh.
Degrees acid-dichromate etching; immersion at 70° C. for 10 min. in mixed solution containing 10 parts of concentrated sulfuric acid, 1 part of dischromate and 30 parts of water.
Degrees anodic oxidation; applying electric current of 0.5 a./dm.$^2$ at 42 v. for 5 min. in 10% sulfuric acid aqueous solution.
Degrees sandpaper abrasion combined with acid-dichromate etching; additionally acid-dichromate etching after sandpaper abrasion.

EXAMPLE 28

After cleaning a high density polyethylene film (Hizex) having thickness 100μ with toluene, irradiation is conducted in the air at distance of 2 cm. for 5 minutes by the use of straight type low pressure mercury lamp (60 w.) whose tube wall is of high purity—99.98%—optical quartz at 127 v. and 600 ma. The irradiated surface of polyethylene was overlaid on a copper foil (thickness 35μ) having been subjected to chromate treatment by the use of a dilute aqueous solution of sodium dichromate after electrolytic deposition and was molten and bonded with said copper foil by pressing at 180° C. under 50 kg./cm.$^2$ for 5 minutes. Bonding properties of the resulting specimen were examined by conducting tests on electric insulation, dielectric insulation, etching, soldering immersion and repeated folding. The results are shown in Table 7.

For the purpose of comparison, also bonding properties in the case of using an unirradiated polyethylene film are shown.

TABLE 7

| Property | FUV Irradiation | Unirradiation |
|---|---|---|
| Etching Property a | Non peeled | Peeled from edge. |
| Soldering Immersion Property b | do | Expansion produced. |
| Repeated Folding (cycles) c | 50–120 | 5–20. |
| Volume Resistance (Mω) d | 1.06×10$^{10}$ | |
| Surface Resistance (Mω) d | 1.34×10$^{10}$ | |
| E (1M cycle) e | 2.43 | |
| tan δ (1M cycle) e | 3.09×10$^{-4}$ | | a Immersed at room temperature for 10 minutes in 45% ferric chloride aqueous solution.
b Making copper foil surface contact for 10 seconds on soldering bath at 230° C.
c Number of cycles of repeated folding of 720 to test toughness until copper foil having width of 1 inch and lined with polyethylene on the back surface is broken.
d Measured in accordance with JIS-K 6911 by placing main electrode having diameter 50 mm. inside copper foil remained in ring shape by etching and placing anti-electrode on the back surface (through layer) or outside (along layer) of the ring.
e Measured in accordance with JIS-K 6911 by holding the top and back surfaces of banded sheets having diameter 50 mm. and lined with copper foil on one surface between electrode having diameter 38 mm.

As shown in Table 7, the far ultraviolet ray irradiated one is good in bonding properties, but the unirradiated one is bad in bonding properties and cannot be used in practice. With respect to electrical properties, the former has sufficient properties as flexible electric materials.

EXAMPLE 29

In order to examine influences of irradiation intensity, by the use of different output straight tube type low pressure mercury lamp made of 99.98% high purity purity optical quartz and further by means of changing irradiation distance—to apply different far ultraviolet ray intensity—irradiation was conducted in the air for 5 minutes on low density polyethylene sheets (Sumikathene) (thickness 3 mm., for each sheet) which then were molten and bonded with aluminum sheets (thickness 0.3 mm. for each sheet) and having been cleaned with trichloroethylene by pressing at 200° C. under the pressure of 15 kg./cm.$^2$ for 2 minutes.

The conditions and the peel strength of the resulting specimens are shown in Table 8. As shown in Table 8, when irradiation strength of ultraviolet ray is in the range of 0.1–10 mw./cm.$^2$, higher peel strength than 15 lb./in. can be obtained.

TABLE 8

| Lamp Output (w.) | Output Per Unit Radiation Length (w./cm.) | Lamp Voltage (v.) | Lamp Electric Current (ma.) | Irradiation Distance (cm.) | Far Ultraviolet ray Intensity [a] (mw./cm.²) | Peel Strength (lb./in.) |
|---|---|---|---|---|---|---|
| 15 | 0.5 | 72 | 230 | 5.0 | 0.21 | 18.4 |
| 6 | 0.4 | 49 | 130 | 0.8 | 0.38 | 20.8 |
| 15 | 0.5 | 72 | 230 | 0.8 | 0.98 | 21.9 |
| 60 | 0.6 | 127 | 600 | 0.8 | 3.4 | 20.4 |
| 60 | 0.6 | 127 | 600 | 0.5 | 5.6 | 18.0 |

[a] Far ultraviolet ray intensity was determined by measuring the intensity of 1,849 A. light ray, which emits most strongly of the wave length 2,100–1,600 A. by means of mercury's radiation spectrum, by the use of ultraviolet ray detector made by Japan Spectroscopic Co.

EXAMPLES 30–32

Figure 2:
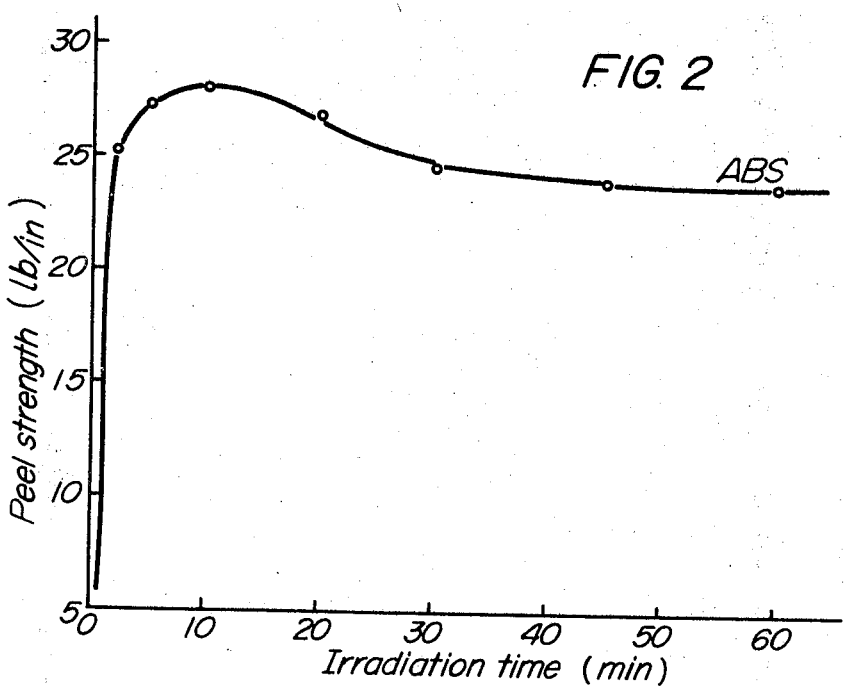

As for low density polyethylene (Sumikathene) sheets, high density polyethylene (Hizex) sheets and ABS (Kralastic) sheets, in order to examine influence of far ultraviolet ray irradiation time on peel strength, by changing only irradiation time variously, each sheet (thickness 3 mm.) was treated as in Example 1 and then was molten and bonded with an aluminium sheet having thickness 0.3 mm. The relation of peel strength and irradiation time with respect to polyethylene is shown in the accompanying drawing FIG. 1 and the relation with respect to ABS is shown in FIG. 2. As shown in the figures, peel strength mount to the maximum in irradiation time of 5–15 minutes, and in longer time they lower more or less. But even in 1–5 minutes or a time longer than 15 minutes, peel strength not lower than 15–20 lb./in. can be well obtained.

EXAMPLES 33–35

Figure 3:
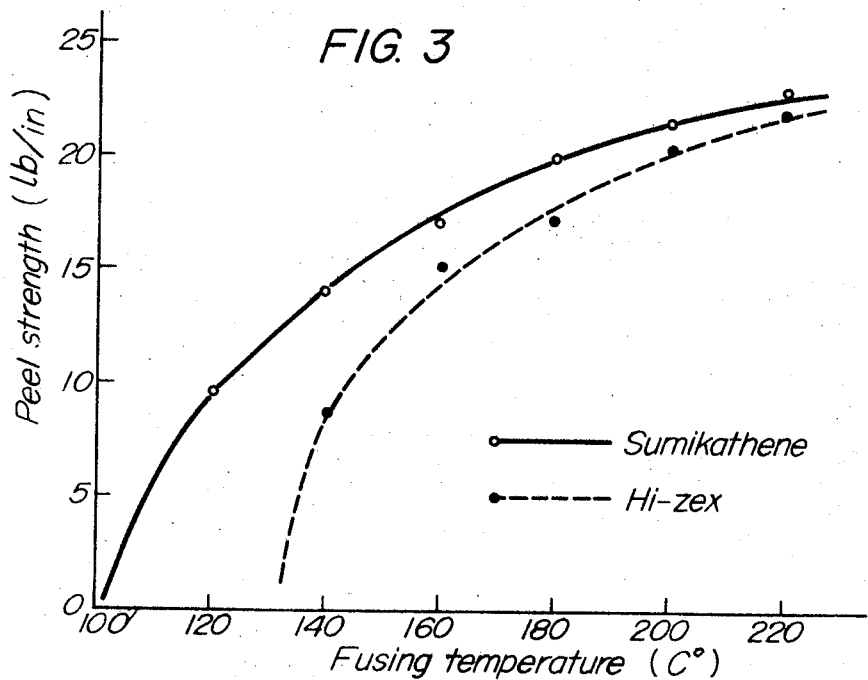
Figure 4:
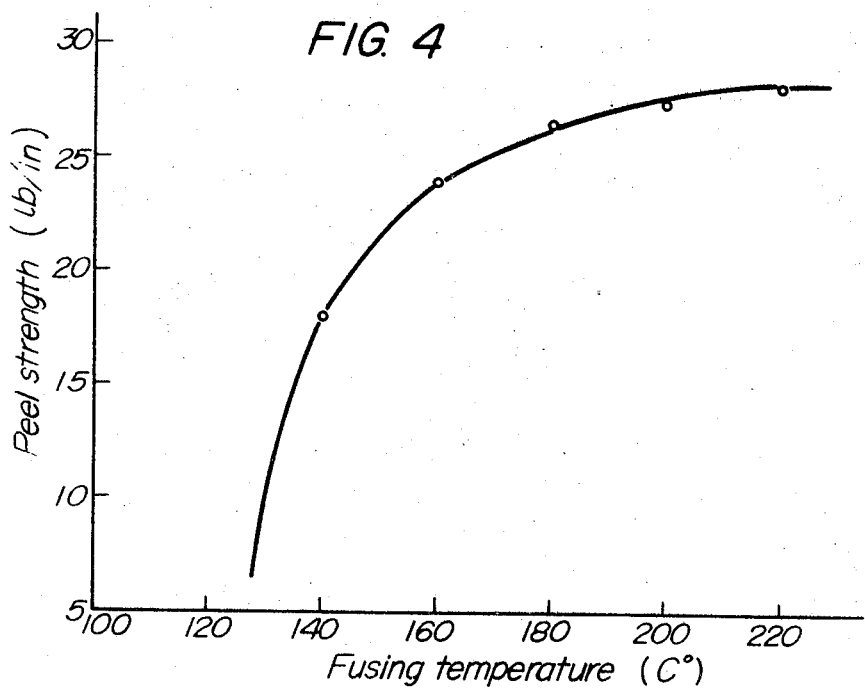

As for low density polyethylene (Sumikathene) sheets, high density polyethylene (Hizex) sheets and ABS (Kralastic) sheets, in order to examine influence of bonding temperature, at which synthetic resin sheet and metal sheet are molten and bonded, on peel strength, by changing only bonding temperature variously each sheet (thickness of 3 mm.) was treated as in Example 1, and then were molten and bonded with aluminium sheet having thickness of 0.3 mm. The relation of peel strength and bonding temperature with respect to polyethylene are shown in the accompanying drawing FIG. 3 and the relation with respect to ABS is shown in FIG. 4. As shown in the both figures, peel strength increases as bonding temperature raises and shows very high values at temperatures higher than 160° C.

EXAMPLE 36

As for low density polyethylene (Sumikathene) sheets, in order to examine influence of purity of quartz and mercury vapor pressure of low pressure mercury lamp made of high purity quartz used for far ultraviolet ray light source, by changing tube wall material of the lamp and by changing mercury pressure with cooling mercury lamp by applying compressed air, cold water or ice water through cooling tube contacted with the tube wall of the low pressure mercury lamp made of high purity quartz each sheet (thickness 3 mm.) was subjected to irradiation treatment and then was molten and bonded with aluminium sheet having thickness of 0.3 mm. with the same other conditions as in Example 1. The influences of tube wall material and mercury pressure on peel strength are shown in Table 9. As shown in Table 9, the peel strength in the case of using low pressure mercury lamp made of high purity quartz is 10 lb./in. higher than in the case of using a mercury lamp not containing wave lengths shorter than 2,100 A. When irradiation is conducted under the maintenance of the mercury vapor pressure within the range of $5 \times 10^{-4} - 1 \times 10^{-1}$ mm. Hg by cooling the tube wall of the low pressure mercury lamp made of high purity quartz, peel strength higher than 15 lb./in. can be obtained.

TABLE 9

| | Purity of Quartz (percent) | FUV Containing amount (percent) [a] | Tube Wall Temperature (° C.) [b] | Mercury Pressure Inside Lamp (mm. Hg) | Peel Strength (lb./in.) |
|---|---|---|---|---|---|
| Optical Quartz: | | | | | |
| No Cooling | 99.98 | 16 | 80 | 0.090 | 17.1 |
| Compressed Air | 99.98 | 16 | 60 | 0.025 | 22.3 |
| Cold Water | 99.98 | 16 | 45 | 0.008 | 23.4 |
| Ice Water | 99.98 | 16 | 20 | 0.001 | 18.3 |
| Common Quartz | 99.50 | 3 | 60 | 0.025 | 10.2 |
| Vycor Glass | | 0 | 60 | 0.025 | 8.1 |

[a] Proportion of light ray of 1,849 A. which emits most strongly of the wave lengths 2,100–1,600 A. in the case of using mercury lamp to the whole ultraviolet ray radiation distribution from mercury lamps. Each mercury lamp was employed after lighting up of 10 hours or more.
[b] The lowest temperature of contacting part with cooling tube.

EXAMPLE 37

The accompanying drawing FIG. 5 is a diagrammatic view of one flow sheet for preparing aluminum-polyethylene sandwich panel continuously according to the present invention.

Referring to FIG. 5 low density polyethylene sheet (Sumikathene) 3 having width of 1000 mm. and thickness of 3 mm. was extruded at a rate of 40 m. per hour out of an extruding machine 1 and passed through calender rolls 2. Thereafter the both surfaces of the sheet were subjected to far ultraviolet ray irradiation treatment in the way that 100 tubes of 60 w. high straight tube type low pressure mercury lamp whose tube wall is of high purity optical quartz 4 having diameter 25 mm. and radiation part length 1100 mm. were arranged at distance 2 cm. from the sheet on each side, the tube wall temperature was regulated at 40–50° C. and radiation was conducted at 127 v. and 600 ma. The time for the sheet to pass through the irradiation part was about 5 minutes. Aluminum sheet 6 having thickness 0.3 mm. and width 1050 mm. was conveyed at the same rate as the irradiated polyethylene sheet 5 was passed through trichloroethylene cleaning bath 7 to be cleaned, and was dried by blowing air. On each surface of the irradiated polyethylene sheet was overlaid an aluminium sheet. The resulting pile was passed through a preheating apparatus 8 and passed in hot state through 7 couples hot pressing roll 9 having roll clearance of about 2.9–3.1 mm. and surface temperature of 200° C. for the purpose of melt-adhesion. Then the sandwich materials were passed through 7 coupled cold roll 10 having surface temperature of 80° C. and further through 8 couples of cold roll 11 having surface temperature at room temperature thereby cooled from 125° C. to 90° C. over about 15 minutes, then to the room temperature.

The sandwich materials were transferred to trimmer part 13, the edges were cut down by rotating cutter 12; the length was cut constantly by shear cutter 14 and sandwich panels were obtained and then were stored in stacker 15. A peel strength of the panels was 29.3 lb./in.

In the case of using high density polyethylene (Hizex) in place of low density polyethylene, using the same conditions as above except that the temperature of the first 7 couples of cold roll was made 100° C. and cooling from 140° C. to 105° C. was conducted over 15 minutes, sandwich panels could be obtained. The peel strength was 30.5 lb./in.

What is claimed is:

1. A method for bonding a synthetic resin sheet and a metal sheet which comprises irradiating, in the presence of oxygen, a far ultraviolet ray having a short wave length in the range 2,100 A. to 1,600 A. on a surface of said resin sheet, said resin sheet comprising a polymerization-type, high molecular weight compound containing at least 20% in molar ratio of the repeating structural unit

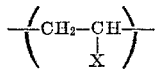

wherein X is selected from the group consisting of hydrogen and a phenyl group, and then melt-adhering the irradiated sheet to the metal sheet at a temperature at least as high as the melting point of said polymerization-type, high molecular weight compound.

2. A method according to claim 1, wherein said irradiation is effected with a far ultraviolet ray having a wave length of 1849 A. emitted from a low pressure mercury lamp made of quartz having a purity of at least 99.90%.

3. A method according to claim 1, wherein said polymerization-type, high molecular weight compound is polyethylene.

4. A method according to claim 1, wherein said polymerization-type, high molecular weight compound is polystyrene.

5. A method according to claim 1, wherein said polymerization-type, high molecular weight compound is an ethylene-vinyl acetate copolymer.

6. A method according to claim 1, wherein said polymerization-type, high molecular weight compound is ABS.

7. A method according to claim 1, wherein said metal is aluminum.

8. A method according to claim 1, wherein said metal is copper.

9. A method according to claim 1, wherein said polymerization-type, high molecular weight compound is polyethylene and said metal is aluminum.

10. A method according to claim 1, wherein said irradiation is effected with a far ultraviolet ray having a short wave length of 1849 angstroms, emitted from a low pressure mercury lamp made of quartz at a light intensity in the range 0.1 mw./cm.$^2$ to 10 mw./cm.$^2$ for a period of 1 to 60 minutes.

11. A method according to claim 1, wherein the eletrical input of the low pressure mercury lamp is 5 to 300 w., the irradiation distance between said lamp and the surface of a synthetic resin sheet to be irradiated is maintained in the range of 0.5 to 20 cm., and the time of irradiation treatment is 1 to 60 minutes.

12. A method according to claim 1, wherein the melt-adhering of the sysnthetic resin sheet to the metal sheet is effective at a temperature in the range 160 to 240° C. under a pressure in the range between the contact pressure and 60 kg./cm.$^2$ 13. A method according to claim 1, wherein said irradiation is effected with a far ultraviolet ray having a wave length of 1849 A. from a low pressure mercury lamp made of quartz having a purity of at least 99.90% and having an electrical input of 5 to 300 w., at a distance of 0.5 to 20 cm. from said lamp for a period of 1 to 60 minutes, and wherein the melt-adhering of said synthetic resin sheet to the metal sheet is effected at a temperature in the range 160° C.–240° C. under a pressure in the range between the contact pressure and 60 kg./cm.$^2$, and cooling is effected gradually from a temperature 20° C. above the melting point of said synthetic resin sheet to a temperature 30° C. below said melting point, over a period of 5 to 50 minutes, then to room temperature.

14. A method for bonding a polyethylene sheet and a metal sheet which comprises continuously extruding a polyethylene sheet at a rate of 5 m./hr. to 200 m./hr., irradiating a surface of said polyethylene sheet in the presence of oxygen with a far ultraviolet ray having a wave length of 1849 angstroms emitted from a low pressure mercury lamp made of quartz having a purity of at least 99.90% and having an electrical input of 5 to 300 w., at a distance of 0.5 to 20 cm. from said lamp for a period of 1 to 60 minutes, overlaying the irradiated surface of said polyethylene sheet on the metal sheet which is conveyed at the same rate as that of said polyethylene sheet, passing the resultant assembly through 1 to 20 pairs of rolls, at a temperature in the range 160° C. to 240° C., and then gradually cooling the resulting laminate from a temperature 20° C. above the melting point of said synthetic resin sheet to a temperature 30° C. below said melting point, over a period of 5 to 50 minutes, then to room temperature.

References Cited

UNITED STATES PATENTS

| | | | |
|---|---|---|---|
| 2,715,075 | 8/1955 | Wolinski | 156—272 |
| 3,287,197 | 11/1966 | Errede | 156—272 |

FOREIGN PATENTS

| | | |
|---|---|---|
| 609,525 | 11/1960 | Canada. |
| 760,611 | 11/1956 | Great Britain. |

DOUGLAS J. DRUMMOND, Primary Examiner

U.S. Cl. X.R.

161—216; 264—22; 204—159.2